Figure 1:
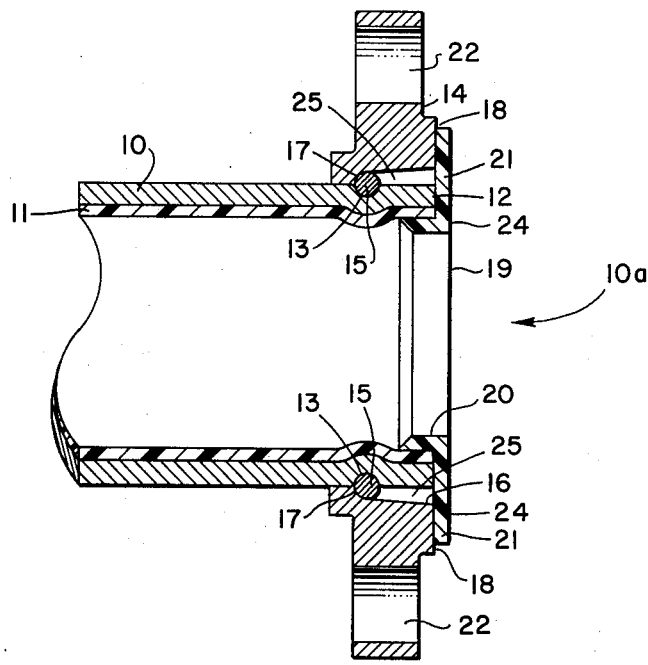

United States Patent [19]  
Hunter

[11] 3,968,552  
[45] July 13, 1976

[54] METHOD AND APPARATUS FOR FORMING PLASTIC LINED JUNCTION IN LINED PIPE

[76] Inventor: John J. Hunter, 1410 Willow Pond, Abilene, Tex. 79103

[22] Filed: Oct. 24, 1974

[21] Appl. No.: 517,686

[52] U.S. Cl. ............................ 29/157 R; 285/55
[51] Int. Cl.² ...................... B23P 15/00; F16L 23/02
[58] Field of Search ............ 29/157 R; 285/55, 363, 285/368, 415; 138/141; 29/DIG. 32

[56] References Cited
UNITED STATES PATENTS

| 1,152,973 | 9/1915 | Rice | 285/363 |
| 1,851,574 | 3/1932 | Fiederlein | 285/415 |
| 2,998,984 | 9/1961 | Gressel | 285/55 |
| 3,199,879 | 8/1965 | Fleming | 285/55 |
| 3,228,096 | 1/1966 | Albro | 29/157 R |
| 3,235,291 | 2/1966 | Jacoby | 285/368 |
| 3,473,359 | 10/1969 | Joslin | 72/121 |
| 3,494,813 | 2/1970 | Lawrence et al. | 138/141 |
| 3,615,984 | 10/1971 | Chase | 285/55 |

FOREIGN PATENTS OR APPLICATIONS

| 47,705 | 8/1933 | Denmark | 285/368 |
| 449,250 | 11/1927 | Germany | 285/415 |
| 904,975 | 9/1962 | United Kingdom | 285/55 |

*Primary Examiner*—C.W. Lanham  
*Assistant Examiner*—Dan C. Crane  
*Attorney, Agent, or Firm*—Jack A. Kanz

[57] ABSTRACT

Disclosed are methods and apparatus for effecting a fully lined junction between the end faces of two joints of plastic lined pipe. An annular groove is formed in the outer surface of the pipe at a predetermined distance from the end of the pipe joint and a ring fitted within the groove. A rigid flange having an internal shoulder which mates with the external surface of the pipe joint and the ring and which has a radially extending face is positioned over the ring and the end of the pipe joint so that the radially extending face lies in the same plane as the end face of the pipe. An end face liner having a cylindrical body which mates with the internal dimensions of the pipe liner and a radially extending flange is bonded within the open end of the pipe so that the radially extending flange mates with both the end face of the pipe and the radially extending face of the rigid flange.

5 Claims, 2 Drawing Figures

U.S. Patent   July 13, 1976   3,968,552

METHOD AND APPARATUS FOR FORMING PLASTIC LINED JUNCTION IN LINED PIPE

This invention relates to methods and apparatus for forming plastic lined junctions in plastic lined pipe or conduit commonly used for handling acids, caustics, salt water and other corrosive fluids. More particularly, it relates to methods and apparatus for joining uncoated ends of plastic lined pipe and coating the end facings of said plastic lined pipe to provide means for effecting a fully lined conduit when joints of lined pipe are joined.

Plastic lined pipe have long been used for conducting acids, caustics, salt water and other corrosive fluids which cause deterioration of metal pipes. Several effective methods for forming plastic coatings over the entire inner surface of the conduit are known in the art. For example, U.S. Pat. No. 3,422,856 to John J. Hunter et al. and U.S. Pat. No. 3,758,361 to John J. Hunter disclose methods for bonding thermal adhesive liners throughout the entire interior of a pipe joint and also the end facings thereof so that the pipe joints, both threaded and non-threaded, may be joined to form a fully lined conduit. Frequently, however, it is necessary to remove a portion of a joint of plastic lined pipe after the pipe is installed to insert a T or remove and replace a ruptured or faulty pipe. When such repairs or alterations are made in a pipe string, a pipe joint must be cut and the open end thereof joined with another pipe joint or other conduit means.

It will be observed, however, that when a plastic lined pipe has been cut, the end facing of the metal pipe is exposed. Accordingly, unless special precautions are taken to protect the exposed end facing of the pipe, the exposed end will be in fluid communication with the interior of the conduit when the conduit is rejoined.

It will be appreciated, of course, that a conventional flange cannot be welded directly to thin-walled pipe which has a plastic liner since the heat generated by the welding process will ordinarily destroy the plastic liner. Furthermore, the pipe is frequently of such thin-walled construction that it cannot be conveniently threaded to attach a flange or nipple. Accordingly, alternative joining means is required.

In accordance with the present invention methods and apparatus are provided for securing within the open end of the lined pipe a plastic lining flange and a interconnecting flange which forms a fully lined pipe joint when the pipe joint is joined with an adjacent pipe joint, a T, or other conduit means. A fully lined end face is achieved by forming an annular groove in the outer surface of the pipe joint at a predetermined distance from the open end thereof, fitting a flange over the open end of the pipe and a compression ring within the groove, the flange having a shoulder on its inner surface which conforms to and mates with the compression ring and also having a radially extending face which aligns with the open end of the pipe, and inserting a plastic flange member or collar within the open end of the pipe. The plastic flange has a cylindrical body which fits within the plastic liner in the pipe and an outwardly radiating flange which mates with the exposed end face of the pipe and the face of the connection flange. Abutting ends of lined pipe with exposed end faces may thereby be joined to form a fully lined junction between two pipe joints which previously had exposed end faces.

It will thus be observed that when repairs or alterations must be made in string of installed pipe, an entire pipe joint need not be removed. Instead, only a small portion of the pipe need be exposed and removed from the string. A new portion may be substituted for the portion removed. Using the teachings of this invention a fully lined conduit is formed which includes the short joint or other conduit means spliced into the string. Furthermore, if a T or other apparatus must be installed in the pipe string, only the immediately affected portion of the conduit need be exposed. Therefore, extremely rapid repairs and alterations may be made in a lined pipe and, using the teachings of the invention, a fully lined repair or alteration performed.

Figure 2:
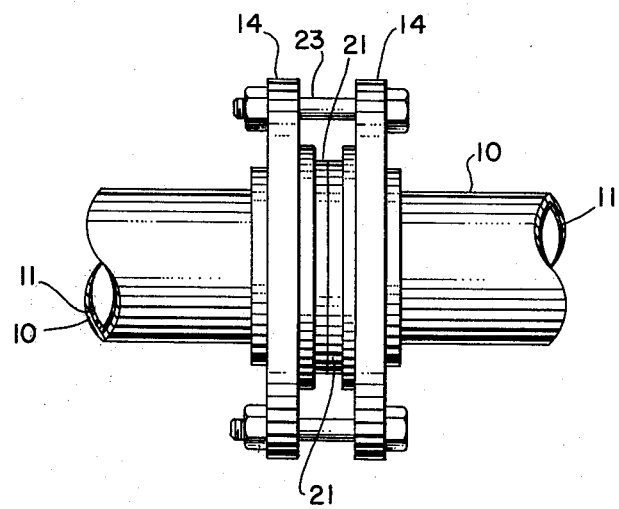

Other features and advantages of the invention will becomes more readily understood from the following detailed description taken in connection with the appended claims and attached drawings in which:

FIG. 1 is a sectional view of the end portion of the open end of a lined pipe joint showing the apparatus of the invention; and FIG. 2 is elevational view of a completed junction utilizing the invention on opposed open ends of abutting pipe joints.

Referring now to the drawings, FIG. 1 illustrates the open end portion of a pipe joint 10 having a plastic liner 11. Pipe joint 10 may be any conventional metal pipe of either threaded or non-threaded type and liner 11 is a conventional tubular liner formed of thermal plastic, such as polyvinylchloride or other plastic, as is well known in the art. Conventionally, the liner 11 is bonded to the internal surface of the pipe 10 to form a plastic lined joint. The end faces of the pipe are likewise lined, thereby forming a fully lined conduit when the joints are joined.

When a section of a conduit formed by joints of pipe such as pipe 10 is removed, the removal is usually accomplished by merely cutting through the pipe. The pipe may be cut for several reasons, such as to remove a faulty or leaky section or to install a T or other apparatus. However, when a portion of the conduit is removed, such as by sawing or the like, the pipe 10 and liner 11 are both severed in the same plane leaving an open end 10a. The end face 12 of the pipe 10 is thus exposed and not coated with the liner.

If the pipe joint 10 is to be joined with a substitute pipe joint, T or the like, means must be provided to connect the open end 10a with the substitute pipe or other device. The junction between the open end 10a and the substitute pipe, however, will ordinarily leave the open end face 12 exposed to the interior of the conduit, thus subjecting the end face 12 of the pipe to the corrosive action of any fluid passing through the conduit. In accordance with the invention an annular groove 13 is formed on the outer surface of pipe 10 at a predetermined distance from the end face 12 thereof. Groove 13 may be formed by any conventional means such as by groove rolling apparatus well known in the art. A rigid flange 14 is then passed over the open end of the pipe and a ring 15 fitted within the groove. Ring 15 is preferably a steel ring of circular cross-section split to allow the ring 15 to expand and slide over the end of the pipe 10 and fit snugly within groove 13 as illustrated in FIG. 1.

Rigid flange 14 has a centrally located opening 16 of non-uniform diameter. The larger diameter portion of the opening 16 is large enough to pass over ring 15. The opening 16 includes an inwardly projecting shoulder 17 adapted to mate with ring 15. The smaller diameter portion of opening 16 substantially conforms to the outer dimensions of the exterior of pipe 10. Flange 14 also includes a radially extending face 18 which lies in the same plane as the end face 12 of pipe 10 when shoulder 17 mates with ring 15. Accordingly, when flange 14 is positioned over the end of the pipe 10 and ring 15 as illustrated in FIG. 1, shoulder 17 mates with ring 15 and ring 15 is locked in groove 13. Therefore, radially extending face 18 is locked in the plane of end face 12.

An end face liner 19 is then positioned within the open end 10a of the pipe 10. As illustrated in FIG. 1, the end face liner 19 comprises an open-ended cylindrical body 20, the outer dimensions of which substantially conform to the internal dimensions of liner 11 in pipe 10. The end face liner 19 includes a radially extending flange 21 which radiates outwardly from one end of the body and mates with both the end face 12 of pipe 10 and the radially extending face 18 of rigid flange 14 as illustrated in FIG. 1. Preferably the end face liner 19 is of the same material as liner 11. Therefore end face liner 19 may be bonded to liner 11 with a solvent such as methyl ethyl ketone or any suitable conventional epoxy cement.

Flange 14 includes a plurality of holes 22 parallel with central opening 16 through which connector bolts 23 (as shown in FIG. 2) may be passed to accomplish coupling of the pipe joint to another pipe joint or other apparatus.

Where coupling between two open ended pipe joints, each having an exposed end face 12, is to be accomplished, the coupling described in FIG. 1 may be formed on the abutting ends of both joints, the faces 24 of the radially extending flange end faces of the liners being drawn together by bolts 23 passing through holes 22.

To provide added rigidity to the connection formed and aid in sealing between two abutting plastic flanges 21, the annular space 25 may be filled with an epoxy plastic or other suitable material.

It will be readily understood that end face liner 19 may be constructed of any suitable material such as polyvinylchloride or the like. Preferably the end face liner 19 is of the same material as liner 11 and may be bonded directly thereto by applying a suitable solvent such as methyl ethyl ketone. Alternatively, the end face liner 19 may be bonded to the liner 11 with any suitable conventional adhesive or a polyvinylchloride cement. Likewise the radially extending flange 21 is preferably bonded to the end face 12 of pipe joint 10 as well as the radially extending face 18 of the rigid flange 14. Where space 25 is occupied by a filler, the flange 21 may likewise be bonded to the filler with any suitable adhesive or solvent.

From the foregoing it will be observed that a fluid seal is effected by pressing abutting faces of opposed flanges 21 together as shown in FIG. 2. If desired, suitable adhesive or solvent may also be applied to the abutting flanges immediately prior to final assembly. The opposed open ends of pipes 11 are then drawn together by bolts 23 to complete the coupling.

It will be observed that the method and apparatus described herein may be used on practically any size of metal pipe, either threaded or unthreaded. The coupling may readily be performed in the field on buried pipe with only minimum exposure of buried line. Furthermore, the rigid flanges 14 may be adapted to mate with each other, as shown in FIG. 2, or adapted to mate with other apparatus such as a T or the like which already has an end face liner.

While the invention has been described with particular reference to specific embodiments thereof, it is to be understood that the forms of the invention shown and described in detail are to be taken as preferred embodiments of same and that various changes and modifications thereof may be resorted to without departing from the spirit and scope of the invention as defined by the appended claims.

I claim:

1. The method of lining the end face at the open end of a lined pipe joint having a plastic liner bonded to the entire interior of said pipe joint comprising the steps of
   a. rolling an annular groove adapted to mate with a compression ring of circular cross-section in the outer surface of said pipe joint at a predetermined distance from the open end of said pipe joint,
   b. placing a ring of circular cross-section within said annular groove,
   c. placing a rigid flange on the outer surface of said pipe joint, said flange having a central opening substantially conforming to the outer dimensions of said pipe joint and having
      i. an annular shoulder in said central opening mating with said ring and
      ii. a radially extending face lying in the plane of the open end of said pipe joint when said shoulder mates with said ring,
   and
   d. inserting a plastic collar in the open end of said pipe joint, said plastic collar comprising a cylindrical body, the outer dimensions thereof substantially conforming to the inner dimensions of the liner in said pipe joint and a flange extending radially from one end of said cylindrical body, said radially extending flange mating with both the open end of said pipe joint and said radially extending face on said rigid flange.

2. The method set forth in claim 1 including the step of bonding said plastic collar to the liner in said pipe joint.

3. The method set forth in claim 1 including the step of bonding the radially extending flange of said collar to the end face of said pipe joint.

4. The method set forth in claim 1 including the step of bonding the radially extending flange of said collar to the radially extending face of said rigid flange.

5. The method set forth in claim 1 including the step of filling the space between the inner surface of said rigid flange and the external surface of said pipe joint with a filler.

* * * * *